Jan. 10, 1928. 1,655,841
A. W. PATTISON
COMBINED BUMPER AND HEADLIGHT
Filed Oct. 2, 1925
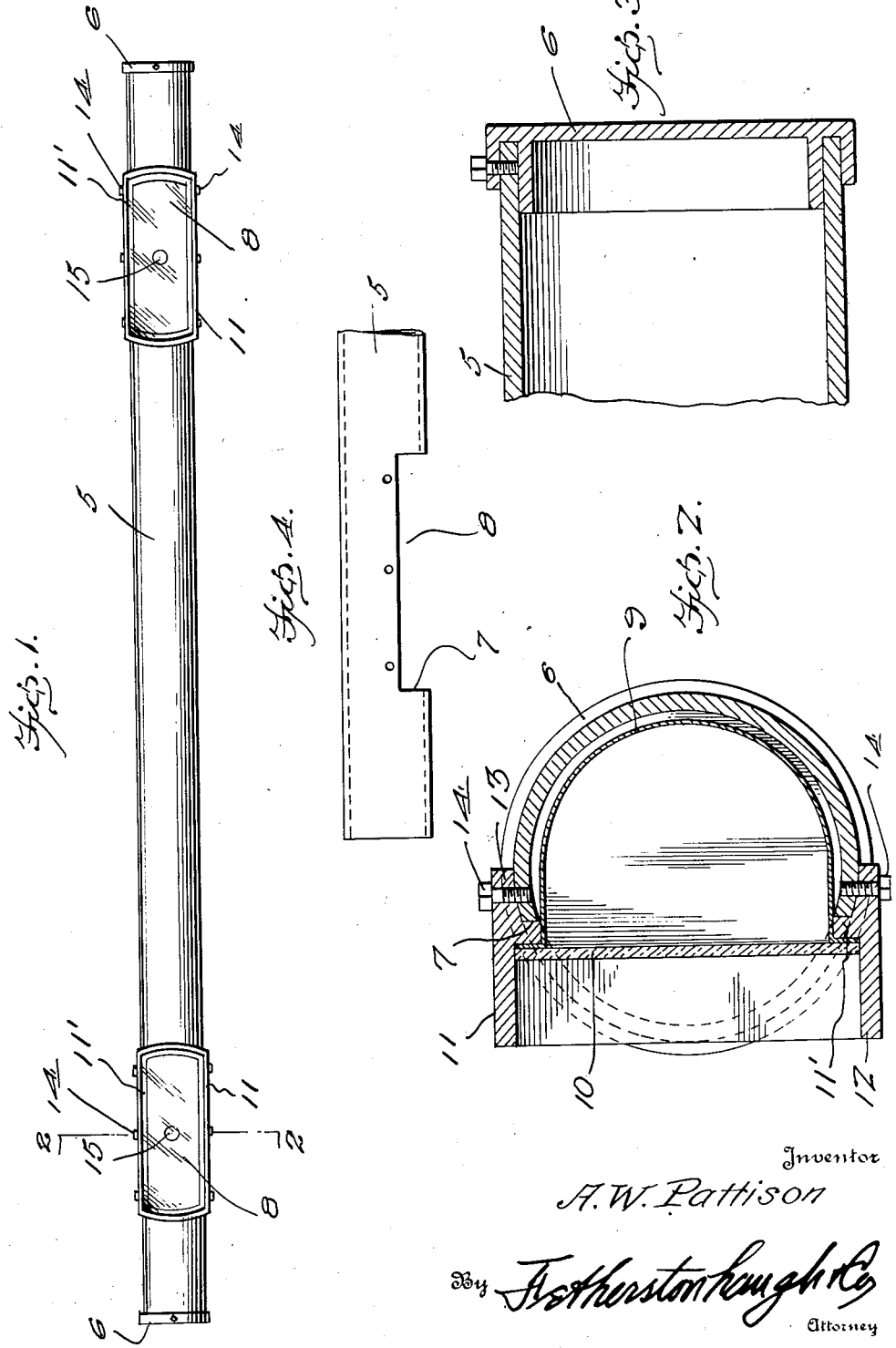
Inventor
A. W. Pattison
By Fetherstonhaugh & Co
Attorney Patented Jan. 10, 1928.

1,655,841

UNITED STATES PATENT OFFICE.

ALBERT W. PATTISON, OF LOCKPORT, NEW YORK.

COMBINED BUMPER AND HEADLIGHT.

Application filed October 2, 1925. Serial No. 60,089.

The purpose of this invention is to provide a combined bumper and road lamp structure in which the lamp bodies are mounted within the bumper so that the light rays are projected forwardly through suitable front openings formed in the bumper, said lamp bodies being protected by suitable guard frames arranged over the said front openings and within cut-out portions of the bumper so that the said frames are flush with the front of the bumper.

Other purposes and advantages of the invention as well as the details of construction and arrangement of parts will be more readily understood from the following detailed description and accompanying drawings in which—

Figure 1 is a view in front elevation of a bumper constructed in accordance with my invention.

Figure 2 is a transverse sectional view on line 2—2 of Figure 1.

Figure 3 is a fragmentary vertical sectional view through one end portion of the bumper and Figure 4 is a fragmentary top plan view of one end portion of the bumper as it appears before the lamp casing and guard frame are attached thereto.

As shown in the accompanying drawings the bumper 5 is of tubular construction being closed at the ends by suitable caps 6. Near each end a front portion of the bumper is removed to provide a recess 7 and a front opening 8. Behind each front opening 8 is positioned a lamp body 9 having its open side arranged to project forwardly into said opening and closed by a suitable lens 10 secured in any suitable manner within a rectangular guard frame 11.

Each frame 11 is mounted in one of the recesses 7 so that the front edge of the frame is flush with the front of the bumper. These frames may be of any suitable design but are herein shown as consisting of a centrally apertured base member 11' formed with a continuous marginal flange 12 projecting forwardly to the front plane of the bumper 5. At its upper and lower edges the said base 11' is formed with rearwardly projecting flanges 13 telescoping the bumper as shown to advantage in Figure 2 and secured thereto by screws 14 or other suitable fastening means.

Within each lamp body 9 is arranged one or more electric lamps 15 which are connected to a source of current supply in any suitable manner.

From the foregoing it will be apparent that the frames 11 serve as guard frames to prevent direct impact between the lamp bodies 9 and any obstacle encountered by the bumpers. It will be further noted that by mounting the guard frames in cut-out portions of the bumper the front edges of said frames are disposed flush with the front of the bumper. This is important as it is not desirable to have the guard frames projected forwardly beyond the bumper as in such cases the guard frames would be forced to sustain the full impact when an obstacle is encountered.

While in the foregoing I have disclosed what is now considered to be a preferred embodiment of the invention it will be understood that various changes may be made in the proportion and arrangement of parts without departing from the scope of the appended claims.

What I claim is:

1. A combined bumper and road lamp structure comprising a tubular impact member having a front portion thereof removed to provide a recess and a front opening, a lamp body arranged in said member with the light emitting portion of said body opposite said opening, a centrally apertured guard frame secured in said recess and provided with a forwardly projecting continuous marginal flange terminating in the front plane of the tubular member, the vertically extending end portions of said flange being disposed in abutting engagement with end walls of said recess whereby the guard frame is held against shifting movement longitudinally of the impact member independently of the means securing the guard frame in said recess and a lens secured in said guard frame and closing the light emitting portion of the lamp body.

2. A combined bumper and road lamp structure comprising a hollow impact member of circular cross-section, said member having a front portion thereof removed to provide a recess and a front opening, a guard frame having a centrally apertured base member fitted in said recess and abutting upper and lower edges of the impact member and a marginal flange projecting forwardly from said base member and terminating in the front plane of the hollow impact member, the vertical end portions of said flange being arranged to abut opposite end walls of said recess to prevent shifting of the guard frame longitudinally of the impact member, rearwardly projecting flanges carried by the upper and lower edges of the base member of the guard frame and provided with curved inner surfaces engaging upper and lower outer surfaces of the impact member and fastening devices passing through and securing said rearwardly projecting flanges to the engaging portions of the hollow impact member.

In testimony whereof I hereunto affix my signature.

ALBERT W. PATTISON